Sept. 2, 1958 C. P. COOK 2,850,344

RECORD STORAGE DEVICE

Filed Aug. 16, 1956 4 Sheets-Sheet 1

INVENTOR.
Coleman P. Cook
BY Bacon & Thomas
ATTORNEYS

Sept. 2, 1958 C. P. COOK 2,850,344

RECORD STORAGE DEVICE

Filed Aug. 16, 1956 4 Sheets-Sheet 2

INVENTOR.
Coleman P. Cook
BY
Bacon & Thomas
ATTORNEYS

RECORD STORAGE DEVICE

Filed Aug. 16, 1956 4 Sheets-Sheet 3

INVENTOR.
Coleman P. Cook
BY
Bacon & Thomas
ATTORNEYS

Sept. 2, 1958 C. P. COOK 2,850,344

RECORD STORAGE DEVICE

Filed Aug. 16, 1956 4 Sheets-Sheet 4

INVENTOR.
Coleman P. Cook
BY
Bacon & Thomas
ATTORNEYS

United States Patent Office 2,850,344

Patented Sept. 2, 1958

2,850,344

RECORD STORAGE DEVICE

Coleman P. Cook, Falls Church, Va.

Application August 16, 1956, Serial No. 604,475

19 Claims. (Cl. 312—10)

This invention relates to a cabinet or other similar receptacle having expansible and retractable compartmental means disposed therein adapted to receive and loosely retain articles therein, and more specifically, the invention pertains to a cabinet especially designed for the storage of phonograph records.

One of the primary objects of this invention is to provide a cabinet for the safe storage of phonograph records and to provide means for holding in readily accessible form a maximum number of phonograph records in a minimum amount of space.

A further object of this invention is to provide a storage cabinet for phonograph records wherein the compartmental means for the phonograph recormds are adapted to be withdrawn vertically from the cabinet in order to make the records readily accessible and to provide means for holding the compartmental means in a selective extensible position relative to the cabinet.

Another object of this invention is to provide a portable cabinet for safely transporting phonograph records together with divider or partition members for separating each record from adjacent ones thereof to prevent inadvertent or accidental damage to the lands and grooves thereof.

A still further object of this invention is to provide a compartmentalized record holding cabinet wherein the records are held in a flat, horizontal, vertically-spaced relation.

As a still further object of this invention it is proposed to provide a cabinet for the storage of phonograph records together with vertically-extensible means of the lazy tong type including a plurality of spacer members fixedly secured to stringer elements, whereby the spacer members may be collapsed toward each other to maintain each compartment defined by the pair of adjacent spacer members substantially dust free.

A still further object of this invention is to provide a storage cabinet for phonograph records including lazy tong means for projecting record-holding compartments outwardly of the cabinet and including means coacting with the lazy tong means to selectively maintain the lazy tong means in a selected adjusted and extended position.

A still further object of this invention is to provide a storage cabinet for phonograph records wherein all of the working parts thereof are concealed from view when the cabinet is in its closed position.

A further object of this invention is to provide a storage cabinet for phonograph records or other similar articles wherein the cabinet serves as a weighted base having a vertically movable closure member to which is secured a plurality of elements forming compartments therebetween to receive the phonograph records or articles as the closure member is moved vertically away from the base.

Other and further objects and advantages of the instant invention will become more apparent from a consideration of the following specification when read in conjunction with the annexed drawings in which.

Figures 1, 2, 9:
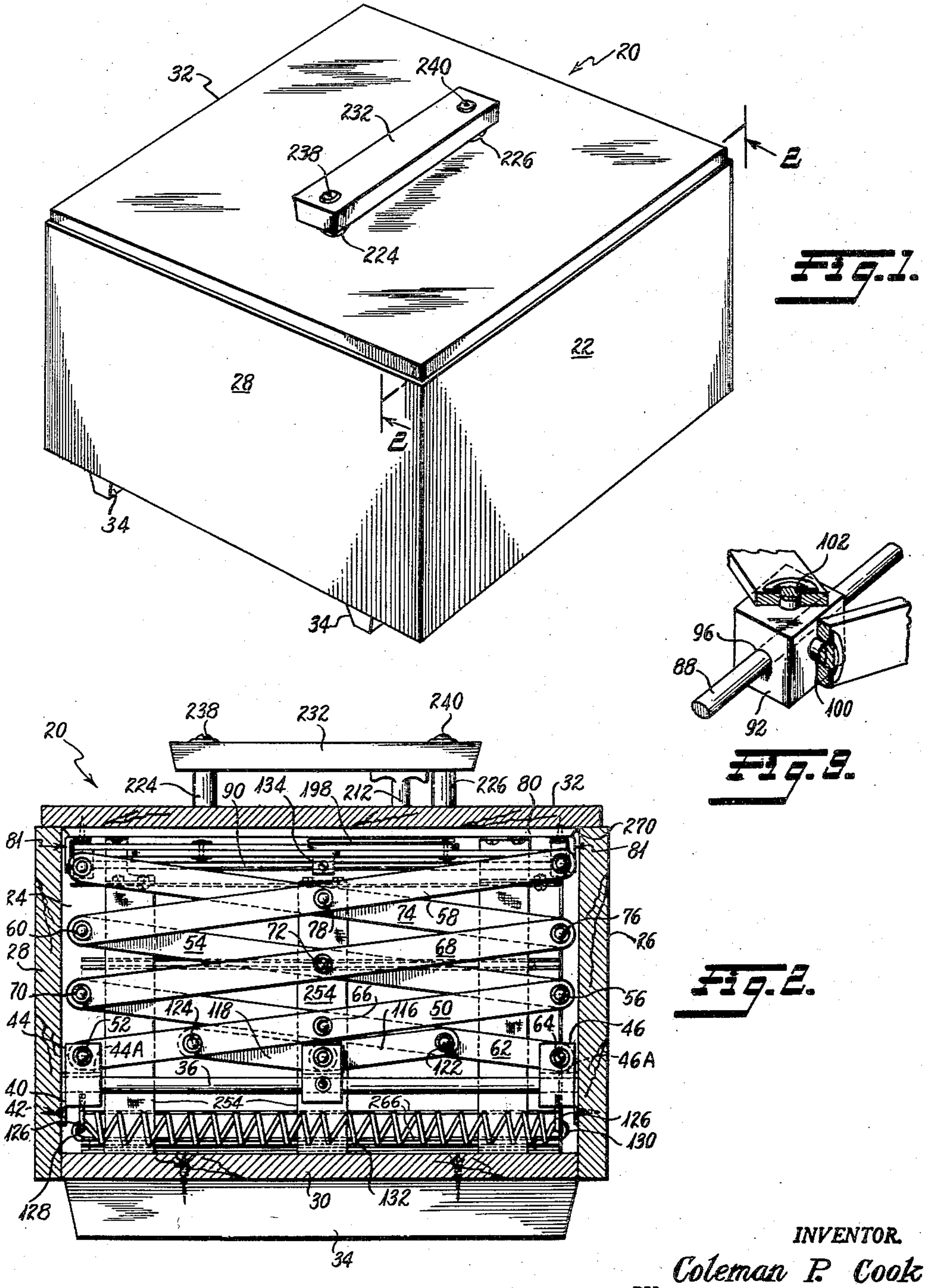
Fig. 1 is a perspective view of the phonograph record storage cabinet constructed in accordance with the present invention, the cabinet being illustrated in its closed or retracted position.
Fig. 2 is an enlarged cross-sectional view of the cabinet shown in Fig. 1, the view being taken on the vertical plane of line 2—2 of Fig. 1, looking in the direction of the arrows.
Fig. 9 is an enlarged fragmentary perspective view partly in cross-section illustrating the manner in which the lazy tong members and cross rods are assembled at the top of the cabinet.

Referring now more specifically to the drawings, reference numeral 20 designates, in general, a portable storage cabinet for phonograph records constructed in accordance with the instant invention. The cabinet 20 is substantially rectangular in configuration and includes the oppositely disposed pairs of side walls 22, 24 and 26, 28, respectively, a bottom wall 30, and a top closure member 32. A pair of elongated legs or skids 34 having an inverted truncated pyramidic cross-sectional configuration are secured to the bottom wall 30 by conventional means. As is seen in the drawings, one of the legs or skids 34 is positioned adjacent the side wall 22 and extends substantially parallel thereto, and the other leg or skid 34 is disposed adjacent the side wall 24 and extends substantially parallel with respect thereto.

Kinematic means 25 of the lazy tong type are employed in opening and closing the cabinet 20. As illustrated in the drawings, these means include a pair of elongated substantially cylindrical rods 36, 38 of which the rod 36 extends in spaced parallel relation with respect to the side wall 22 and in vertically spaced relation in regard to the bottom wall 30. Apertured hanger plates 40 secured to the walls 26, 28 by screws 42 receive and support the opposed ends of the rod 36. Similarly, the rod 38 is seen to extend in spaced parallel relation with respect to the side wall 24 and in vertically spaced relation in regard to the bottom wall 30. A similar pair of apertured hanger plates 40 secured to the walls 26, 28 receive and support the opposed ends of the rod 38.

Figures 3, 10, 12:
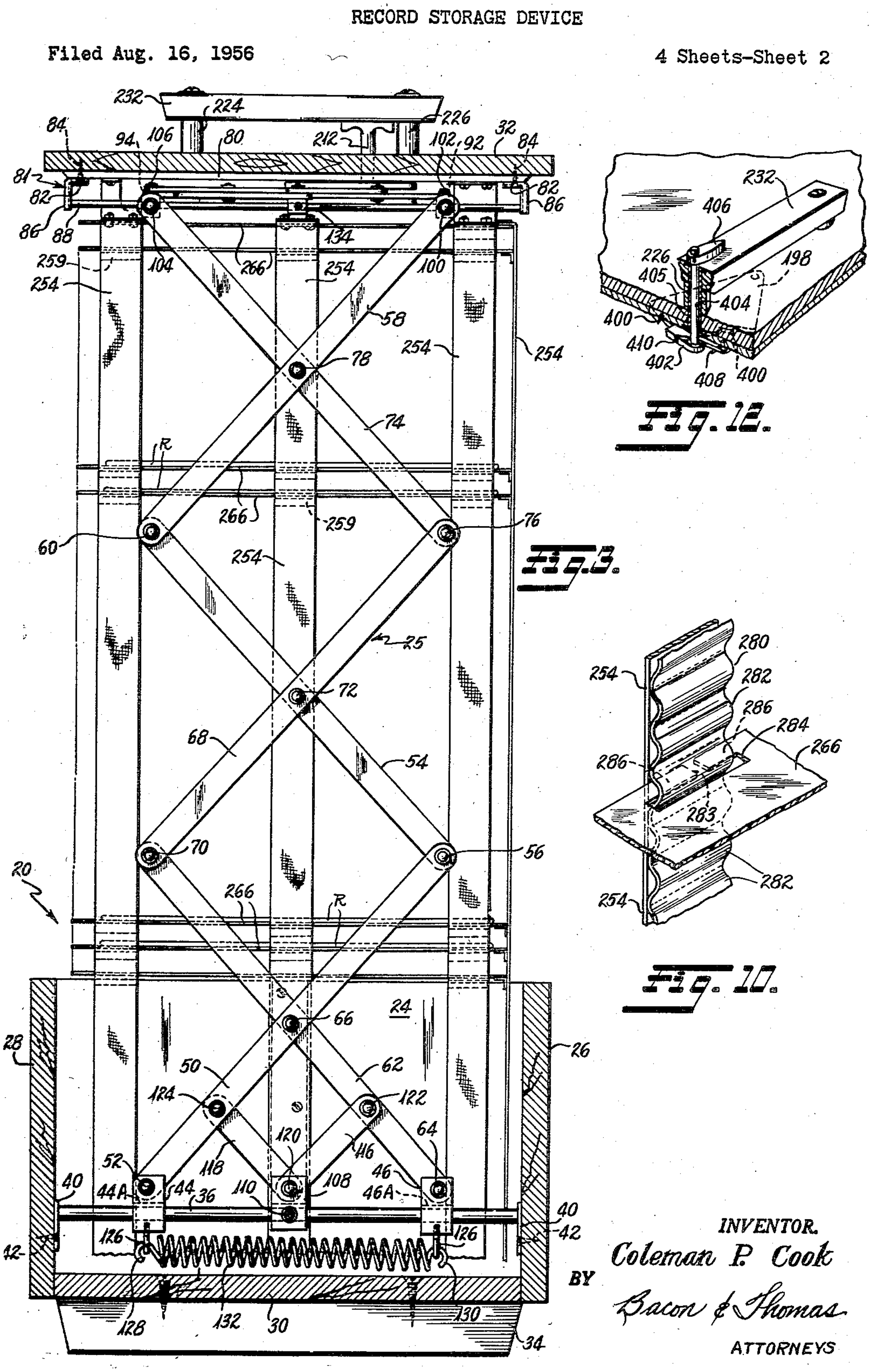
Fig. 3 is an enlarged detail, cross-sectional view similar to Fig. 2, but showing the cabinet top and associated elements in their respective extended position.
Fig. 10 is an enlarged fragmentary, perspective view of an alternate method for securing the dividing partitions to the stringers or tapes.
Fig. 12 is an enlarged detail fragmentary, perspective view of a modified form of the adjustable holding means.

Each of the rods 36, 38 have a pair of substantially rectangular blocks 44, 46 slidably mounted thereon, each block being disposed adjacent the ends, respectively, of its associated rod (see Figs. 2 and 3).

Figure 4:
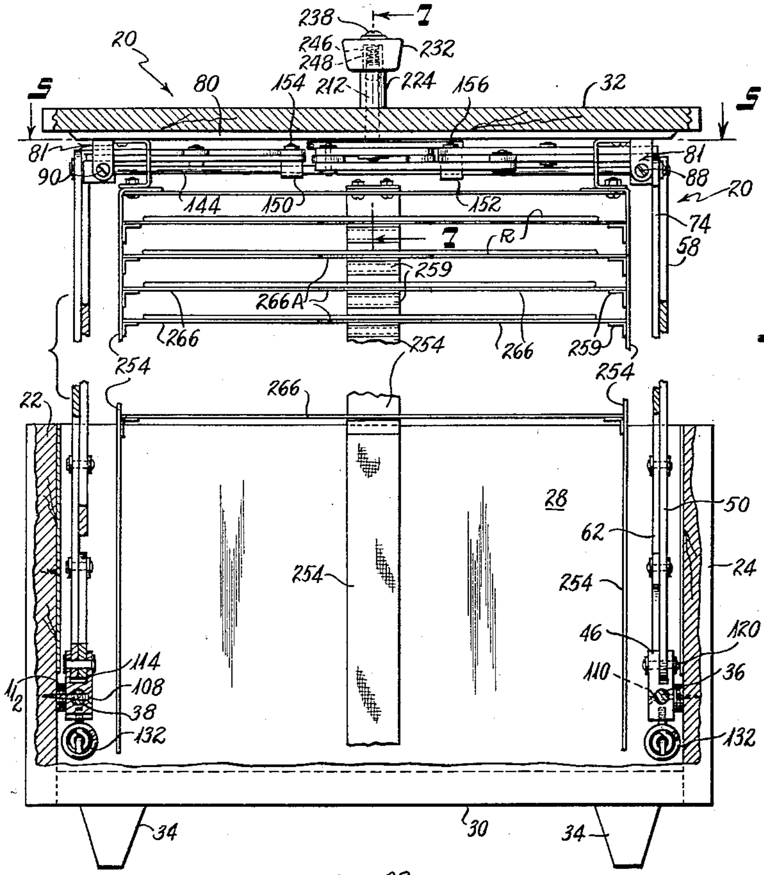
Fig. 4 is an enlarged fragmentary front elevation of the phonograph record cabinet partially broken away to illustrate details of construction.

As is more clearly seen in Figs. 2, 3 and 4, the upper ends of the blocks 44, 46 are slotted at 44A and 46A respectively, the slots extending axially of the rods 36, 38 but being offset with respect to each other.

The blocks 44 at each side of the cabinet 20 receive in their respective slots 44A one end of a lever 50 which is secured for rotation therein by a rivet 52. One end of a second lever 54 is pivotally connected to the inner side of the other end of the lever 52 on rivet 56. A third lever 58 has one of its ends pivotally connected to the other end of the lever 54 on the outer side thereof by rivet 60.

The slots 46A at each side of the cabinet 20 are offset inwardly with respect to the slots 44A and each receives one end of a lever 62 which is pivotally secured therein on rivets 64. As is seen in the drawings, the lever 62 crosses the inner side of the lever 50 and the two levers, at their respective midpoints, are pivotally connected together by the rivet 66. The other end of the lever 62 has superposed thereon one end of the lever 68, and the two ends are pivotally connected by rivet 70.

The lever 68 crosses the outer side of the lever 54, and the two levers are pivotally connected together at their respective midpoints by rivet 72. The other end of the lever 68 is pivotally connected to one end of a lever 74 by rivet 76. The lever 68 is superposed on the lever 74 and the latter crosses the inner side of the lever 58. The levers 58 and 74 are pivotally connected at their respective midpoints on rivet 78.

It will be understood that the number of levers at each side of the cabinet 20 may be indefinitely extended, and that the number thereof is limited only by the capacity of the cabinet.

The underside of the closure member 32 has a substantially rectangular base 80 secured thereto by conventional means (not shown). An L-shaped bracket 81 having a foot portion 82 is disposed at each corner of the base 80 and is secured thereto and to the closure member 32 by a screw 84. The leg portion 86 of each L-shaped bracket is apertured and depends from its associated foot portion 82. Two pairs of the L-shaped brackets are disposed in confronting relationship with the apertures thereof aligned to receive and support therein the opposite ends of a pair of cylindrical rods 88, 90. The rod 88 is adjacent to and extends substantially parallel to the rod 36 and the rod 90 is adjacent to and extends substantially parallel to the rod 38.

A pair of blocks 92, 94 are each provided with a bore 96, 98, respectively, whereby the same may be slidably mounted on the rods 88, 90, the blocks being normally positioned adjacent each end of their respective associated rod.

The blocks 92, 94 are substantially identical in configuration and one thereof, 92, is illustrated in detail in Fig. 9. The block 92 is seen to include a laterally and outwardly extending pin 100 and an upwardly projecting pin 102. The block 94 is formed with corresponding lateral and vertically extending pins 104, 106, respectively.

The upper other ends of the levers 58 are pivotally mounted on the pins 100 after which the outer ends of the pins 100 are peened over. In a similar manner the upper other ends of the levers 74 are pivotally mounted on the pins 104 and the projecting outer ends are also peened over.

A third substantially rectangular block (see Fig. 4) is mounted on each of the rods 36, 38. These blocks, designated by reference numeral 108, are positioned substantially centrally of their respective rods and are fixedly secured thereon by screws 110 which extend through the rods 36, 38, spacer disks 112 and into the adjacent side walls 22 and 24. The upper ends of the blocks 108 are slotted at 114 to receive therein one of the overlapped ends of a pair of links 116, 118 which are pivotally fixedly secured in the slots by means of rivets 120.

The other ends of the links 116 are pivotally connected to the levers 62 by rivets 122 at a point intermediate rivets 64 and 66. The other ends of the links 118 are pivotally connected to the levers 50 by rivets 124 at a point intermediate the rivets 52 and 66.

Each of the blocks 44, 46 has an eye-bolt 126 threaded into the under side thereof which receives the oppositely disposed hook ends 128, 130 of a spring 132 therein. The spring 132 is under constant tension and consequently tends to urge the blocks 44, 46 for movement toward each other.

Figure 8:
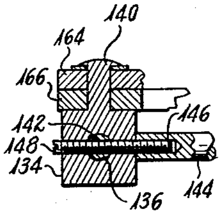
Fig. 8 is an enlarged fragmentary sectional view taken on the horizontal plane of line 8—8 of Fig. 5 looking in the direction of the arrows.

Means are provided for holding the kinematic means 25 in selected extended position. This means comprises a substantially rectangular block 134 mounted on each of the rods 88 and 90. The blocks 134 are identical in configuration, one of which being illustrated in detail in Fig. 8. As shown, the block 134 is seen to have a transverse passage or bore 136 formed therein to receive either the rod 88 or 90 therethrough. A second internally threaded bore 138 extends through the block and intersects the bore 136 at substantially right angles. A pivot pin 140 is integrally formed with the block 134 and projects upwardly therefrom.

Each of the rods 88, 90 are formed with a diametrically extending bore 142 centrally of the ends thereof which is aligned with the bore 138. An elongated substantially cylindrical rod 144 having internally threaded ends 146 extends between the blocks 134 and is disposed in coaxial alignment with the bores 138. A set screw 148 is threaded through the aligned bores 136, 138 and threadedly engages the internally threaded ends 146 of rod 144.

A pair of substantially rectangular blocks 150, 152 having integrally formed pivot pins 154, 156, respectively, are slidably mounted on the rod 144. A pair of levers 158, 160 have one of their respective ends mounted on the pivot pin 154, after which the pin is peened thereby securing the levers to the block 150. The other end of the lever 158 is pivotally mounted on the pin 102 of block 92 adjacent one side of the cabinet and the other end of the lever 160 is pivotally mounted on the pin 102 of the block 94 adjacent the same side of the cabinet, after which, both pins 102 are peened over.

One end of a pair of levers 161, 162 are pivotally mounted on the pin 156 of the block 152, and the other ends thereof are pivotally mounted on the pins 102, 106 of the blocks 92, 94 adjacent the other side of the cabinet 20.

A pair of levers 164, 166 have one of their respective ends mounted on the pin 140 of one of the blocks 134. The lever 164 is pivotally connected by rivet 168 to the midpoint of the lever 158, and the lever 166 is pivotally connected by rivet 170 to the midpoint of the lever 160. As is seen in the drawings (see Fig. 5), the other end of the lever 166 projects laterally beyond the lever 160 and the other end thereof is pivotally connected at 172 to one end of a lever 174.

The other end of the lever 174 is pivotally connected at 176 to one end of a lever 178, a bearing washer 180 being interposed therebetween. The other end of the lever 178 is pivotally connected at 182 to one end of a lever 184, a bearing washer 186 being interposed therebetween. The other end of the lever 184 is pivotally connected at 188 to one end of a lever 190. A pivot connecting 192, adjacent the above-mentioned one end of the lever 190, connects the lever 190 with the lever 161 at substantially its center point.

The other end of the lever 190 is pivotally mounted on the pin 140 of the second block 134. A lever 194 has one of its ends superimposed over the other end of the lever 190 and is also pivotally mounted on the pin 140 of the block 134. The other end of the lever 194 is pivotally connected at 196 to the midpoint of the lever 162.

Figure 5:
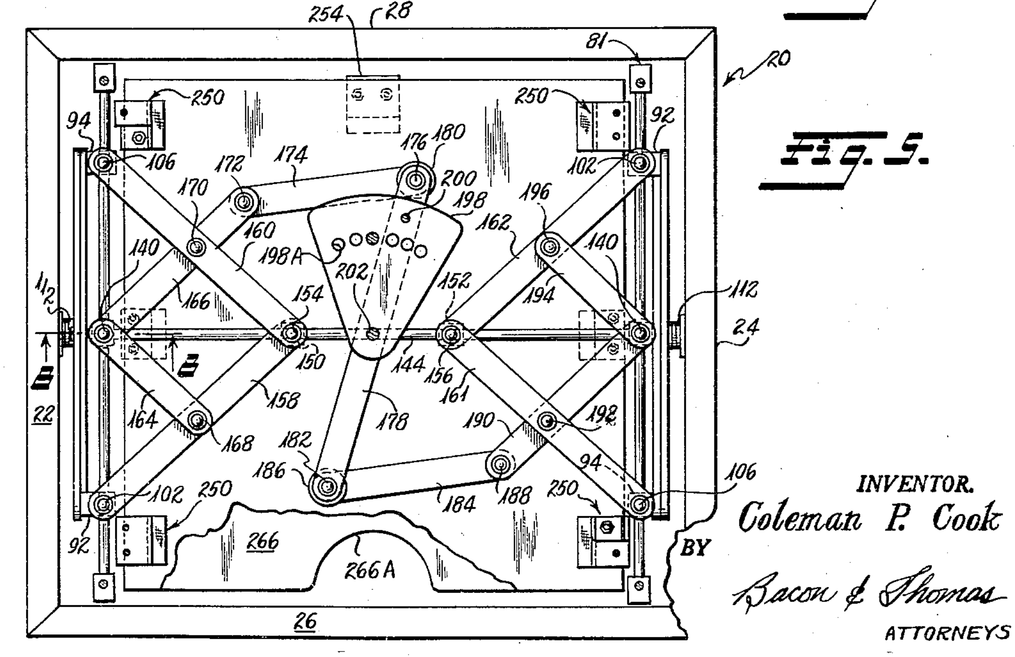
Fig. 5 is a top plan view, partially in cross-section, taken on the horizontal plane of line 5—5 of Fig. 4, looking in the direction of the arrows, and illustrating the details of the means for holding the cabinet in a selected adjusted open position.
Figure 7:
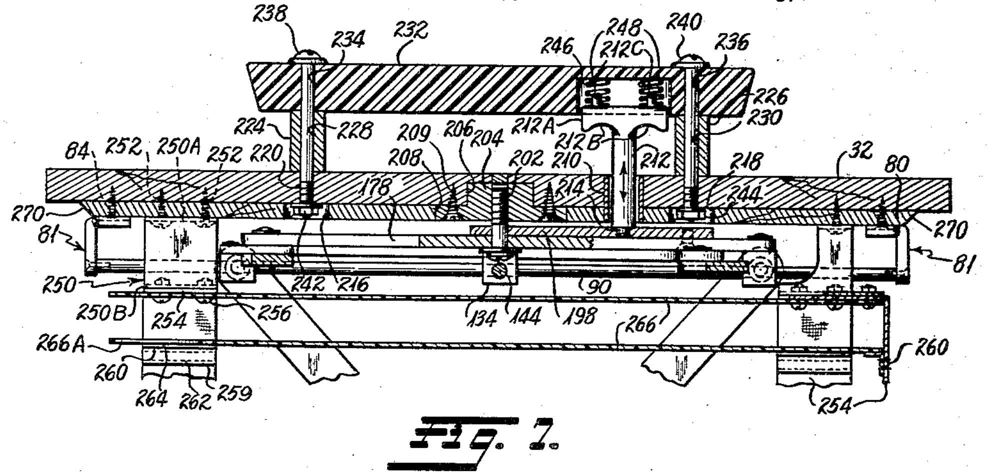
Fig. 7 is an enlarged detail cross-sectional view taken substantially on the vertical plane of line 7—7 of Fig. 4 looking in the direction of the arrows.

Referring more specifically to Figs. 5 and 7 of the drawings, a plate 198 having a substantially triangular configuration is fixedly secured to the lever 178 by means of a countersunk screw or bolt 200. The lever 178, as well as the plate 198, is pivotally mounted on a bolt 202, the bolt 202 being threaded into a fitting 204 which is disposed in recesses 206 and 208 formed in the closure member 32 and the base member 80, respectively, and is secured thereto by a plurality of screws 209.

As is more clearly illustrated in Fig. 7, an elongated substantially hollow cylindrical sleeve 210 extends through the closure member 32 and the base 80. The cylindrical member 210 is adapted to serve as a guide for a manually operated pin 212, the pin 212 being adapted for reciprocation within the sleeve 210. The pin 212 is provided with a free end portion 214 of reduced diameter, the function of which will be set forth below.

The base member 80 is also recessed at 216, 218, the recesses being in open communication with bores 220, 222 respectively, formed in the closure member 32. A pair of spacer members 224, 226 having bores 228 and 230, respectively, are disposed on the closure member 32 with the bores 228, 230 thereof being coaxially aligned with the passages 220 and 222.

A handle member 232 having spaced bores 234 and 236 located adjacent opposite ends thereof is provided, the bores 234, 236 being disposed in coaxial alignment with the bores 228 and 230, respectively, of the cylindrical members 224 and 226. Bolts 238, 240 extend through the aligned bores and secure the handle member 238 to the closure member 32 by means of nuts 242, 244.

The pin 212 is illustrated as being substantially T-shaped in configuration, and the crosshead thereof 212A is seen to be provided with finger-receiving recesses 212B on the underside thereof. The upper side of the crosshead 212A is provided with a pair of upwardly projecting spring guide pins 212C. The handle member 232 is provided with a recess 246, which is adapted to receive the crosshead 212A for reciprocation therein. A pair of helicoidal springs 248, under compression, are disposed within the recess 246, and are adapted to surround the guide pins 212C to bias the pin 212 for movement away from the recess 246.

The free projecting end 214 of the pin 212 lies in the path of movement of the apertures 198A as the plate 198 pivots on bolt 202, and is adapted to be selectively engaged within any one of the apertures 198A whereby the closure member 32 may be adjustably maintained in any desired position. This function will be more fully described below.

A substantially U-shaped bracket member 250 is disposed adjacent each corner of the base 80 and intermediate a pair of sides thereof, the arm 250A of each bracket being secured to the base 80 and to the closure member 32 by means of screws 252. Each of the arms 250B has secured thereto one end of a flexible element 254 by means of bolts 256 and nuts 258. The flexible elements 254 may be formed of fabric or other desirable flexible material.

At spaced intervals along the longitudinal axis of the flexible elements 254, a plurality of tabs 259 are secured thereto formed of a similar flexible material, the securing means comprising the lines of stitches 260, 262. The tabs 259 are each provided with a free end portion 264 which is adapted to engage beneath, and is fixedly secured to, by any conventional means, a substantially rectangular divider or partition member 266. From the foregoing description, it now becomes obvious that the dividers 266 are vertically spaced from each other along the length of the flexible elements 254 forming receptacles adapted to receive a phonograph record or other article therein.

To provide means for readily removing the records from the so-formed compartments, one edge of each of the dividers 266 is provided with a finger recess 266A.

To provide a substantialy dust-free cabinet, the base member 80 is chamfered at 270 so that the edges of the base member 80 fit snugly against the side walls 22, 24, 26 and 28.

From the foregoing specification, it is deemed that the operation of the instant device is quite manifest. However, in the interests of clarity, a detailed explanation thereof follows.

Assuming that the phonograph record cabinet 20 is in its closed position as illustrated in Figs. 1 and 2, and that it is desired to open the cabinet in order to either insert a phonograph record into, or remove a phonograph record from, one of the above-described compartments, the operator will grasp the handle 232 and in so doing place two fingers into the recesses formed in the crosshead 212A of the pin 212. The pin 212 is then removed upwardly against the force of the springs 248 and in so doing becomes withdrawn from 198A. This unlocks the selective adjustment elements referred to above and continued upward movement of the operator's hand will cause the closure member 32 to be withdrawn vertically away from the side walls 22, 24, 26 and 28. In so moving, the kinematic means referred to above of the lazy-tong type are caused to move in the conventional manner, the force required being lessened by the spring 132 which is under a tension.

Figure 6:
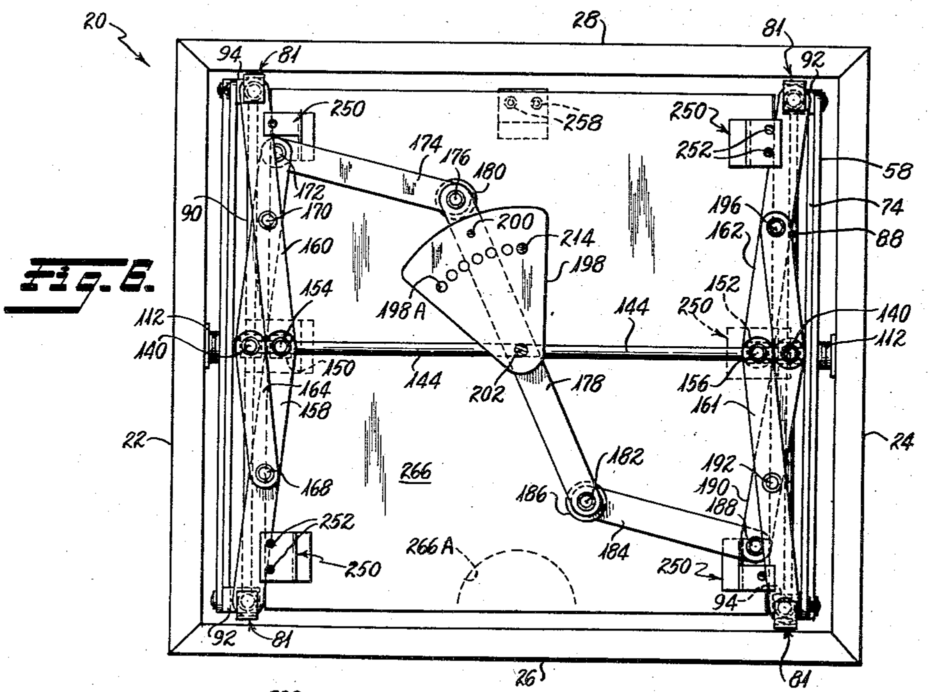
Fig. 6 is a cross-sectional plan view, similar to Fig. 5, illustrating the position of the elements of the holding means when the cabinet is in its closed position.

As the closure member 30 moves away from the cabinet 20, the upper ends of the levers 58 and 74 move toward each other, thereby causing the blocks 92 and 94 to move on the rods 88, 90 in a corresponding direction. As the blocks 92, 94 move the pairs of links 185, 160 and 161, 162, connected thereto and to the blocks 150, 152 the blocks 150, 152 move toward each other on the rod 144. As the levers 160 and 161 are pivoted away from their closed position as viewed in Fig. 6, to the open position illustrated in Fig. 5, the levers 166 and 190 are pivoted inwardly of the cabinet 20 and away from the adjacent side walls 22, 24 thereof. This, in turn, introduces movement of the levers 174 and 184 in opposite directions which is transmitted to the opposite ends of the lever 178 and effects a turning movement thereof about the bolt 202. As the lever 178 turns, the plate 198 also pivots about the bolt 202 and presents successive apertures 198A in confronting relation relative to the reduced end 214 of the pin 212.

At the desired point of elevation of the closure member 32, the operator releases the pin 212 so that the end 214 will enter, under the influence of the springs 248, one of the apertures 198A formed in the plate 198.

With the end 214 of the pin 212 engaged within one of the apertures 198A, the lever 178 is locked against rotation and the lazy tongs 25 are held in their extended position as is illustrated in Fig. 3. Thus, records R or other articles may be placed between or withdrawn from each adjacent pair of dividers or partition members 266 which, taken together, form vertically spaced compartments.

Upon withdrawal of the reduced end 214 of the pin 212 from its coacting aperture 198A, the closure member 30 is pushed downwardly causing the lever 178 and plate 198 to turn in the opposite (counter-clockwise) direction. This movement is transmitted to the levers 178, 184 which, in turn, forces the pairs of levers 158, 160 and 161, 162 to pivot outwardly toward the adjacent sides of the closure member 30 and to assume the position shown in Fig. 6. The pairs of levers 164, 166 and 190, 194 now also pivot outwardly toward the same side of the closure member 30. Should the closure member be forced downwardly to engage the upper ends of the side walls 22, 24, 26 and 28, release of the pin 212 will cause the reduced end 214 to engage the aperture 198A as shown in Fig. 6 which again locks the lazy tongs 25 against movement, and the cabinet 20 may now be carried by handle 232 to another location.

A modification of the present invention is illustrated in Fig. 10 of the drawings. In this modification, the flexible elements 254 have secured thereto an elongated strip of flexible or pliable material 280, the strip 280 being superimposed on the strip 254 in such manner as to form a plurality of sinusoidal loops 282.

The divider members 266 are provided with an inwardly extending slot 283 at the edges thereof, the slot 283 being in open communication at its inner end with an elongated substantially rectangular slot 284, the last-named slot being positioned adjacent the marginal edges of the dividers 266. The slots 283 and 284 define arms 286 which are disposed in spaced confronting relation whereby the superimposed corrugated strip 282 may be crimped or deformed to pass through the slot 283 and to become loosely received within the slots 284.

The above-described construction makes possible the removal of the divider members 266 for dusting or replacement.

Figure 11:
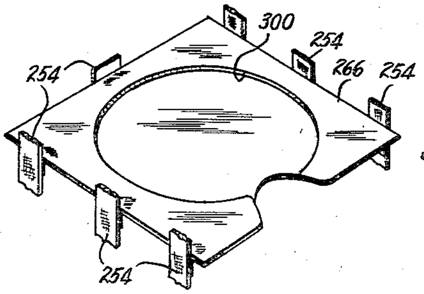
Fig. 11 is a perspective view of a modified form of the compartment defining elements.

A still further modification of this invention is illustrated in Fig. 11. In Fig. 11, each of the divider plates 266 is shown as being formed with a circular recess 300, which is adapted to receive and retain one of the phonograph records. By providing the recess 300, inadvertent and accidental displacement of the records is prevented. This feature of the invention is important, inasmuch as the provision of means for preventing relative movement between the phonograph record and the divider 266 insures against damage to the lands of the records.

A still further embodiment of this invention is illustrated in Fig. 12 of the drawings. In this modification, the plate 198 is provided with a plurality of ratchet teeth 400, the latter being adapted to receive and engage a pawl 402 mounted on the lower end of a shaft 404. The shaft 404 extends through the sleeve 405 which projects through the closure member 32, the base 80, the spacer member 226 and the handle 232. The upper end of the shaft terminates at a point immediately proximate the upper side of the handle member 232. An operating lever 406 is fixedly secured to the shaft 404 adjacent its point of termination. A spring 408 has one of its ends fixedly secured to the base 80 and encircles the lower end of the pin 404 and terminates at its other end in a downwardly projecting tine 410 which engages against the pawl 402 to urge it constantly into engagement with the teeth 400.

Thus, as the closure member 32 is being moved to a selected open position, the ratchet teeth 400 escape from beneath the pawl 402, and when the selected adjusted position has been attained the pawl automatically engages the adjacent ratchet tooth.

To release the closure member from its vertically adjusted position, the operator merely turns the lever 406 in a counterclockwise direction, moving the pawl 402 from the adjacent ratchet tooth 400 thereby freeing the kinematic means for movement in the manner described above.

Having described and illustrated a plurality of embodiments of this invention, it will be understood that the same are offered merely by way of example, and that the invention is only to be limited by the scope of the appended claims.

I claim:

1. A compartmental cabinet comprising a substantially hollow body having an open top, a closure member for said open top, extensible means connecting said closure member with said body for substantially vertical movement toward and away therefrom, spaced elongated flexible means secured to and depending from the under side of said closure member and extending into said body, a plurality of substantially rigid transverse divider members secured to said spaced flexible means at longitudinally spaced intervals therealong with each pair of adjacent divider members forming a compartment therebetween, and holding means for holding said closure member in a selected position above said open top.

2. A compartmental cabinet as defined in claim 1, wherein said holding means comprises means mounted on said closure member and coacting with said extensible means for locking said closure member in a selected position above said open top.

3. A compartmental cabinet as defined in claim 1, wherein said extensible means comprises a kinematic device of the lazy tong type.

4. A compartmental cabinet as defined in claim 1, wherein that side of said closure member disposed immediately adjacent said open end is provided with a portion with a marginal edge thereof chamfered to seat within said open top to form a dust-tight seal.

5. A compartmental cabinet as defined in claim 1, including handle means secured to the top of said closure member.

6. A compartmental cabinet comprising a substantially hollow body formed of a plurality of side walls and having an open top and a closed bottom, a closure member for said open top, lazy tong means secured to said cabinet and to said closure member adjacent a pair of oppositely disposed sides thereof whereby said closure member may be moved vertically toward and away from said open top, a plurality of elongated flexible stringers each having one of its ends secured to the bottom of said closure member and the other end thereof depending from said closure member into said body, and a plurality of substantially rigid horizontal divider members secured to said stringers at vertically spaced intervals, each adjacent pair of divider members forming a compartment therebetween.

7. A compartmental cabinet as defined in claim 6, including means mounted on said closure member coacting with said lazy tong means for locking said closure member in a selected vertical position relative to said open top.

8. A compartmental cabinet comprising a substantially hollow rectangular receptacle having opposed pairs of walls, a bottom wall and an open upper end, a substantially rectangular closure member for said open end, a first pair of rods secured to, respectively, a pair of opposed side walls in spaced parallel relation and positioned adjacent said bottom wall, a second pair of rods mounted on said closure member in spaced parallel relation and disposed, respectively, adjacent a pair of sides thereof, said first and second pairs of rods being parallel to each other, means slidably mounted on said first pair of rods for connecting one end of a pair of lazy tong means thereto, means slidably mounted on said second pair of rods for connecting the other ends of said pair of lazy tong means thereto, whereby said closure member may be moved to a related adjusted position relative to said open end, flexible stringers having one of their respective ends secured to said closure member and the other ends thereof depending therefrom toward said receptacle, said stringers depending from three sides of said closure member, and a plurality of substantially rigid divider members secured to said stringers at longitudinally spaced intervals to form compartments between each adjacent pair thereof.

9. A compartmental cabinet as defined in claim 8, and means mounted on said closure member and connected with said last-named slidable means for locking said closure member in a selected adjusted position.

10. A compartmental cabinet as defined in claim 9, said locking means comprising a lever pivotally mounted on said closure member, lever means connected with one end of said lever and with one of said last-named slidable means whereby movement of said last-named slidable means imparts a turning movement to said lever, a plate having a plurality of arcuately spaced openings extending therethrough, said plate being fixedly secured to said lever for movement therewith, and detent means mounted on said closure member for selective engagement with one of said openings to lock said plate against a turning movement whereby said closure member is held in a given selected position relative to said open end.

11. A compartmental cabinet as defined in claim 10, said closure member having a handle mounted thereon, said handle having a recess formed therein, and said detent means including a pin having a crosshead at an end thereof, said pin being mounted for reciprocation through said closure member and said crosshead being disposed within said recess, and resilient means disposed in said recess and engaging said crosshead to constantly urge said pin away from said handle and into engagement with a selected one of said openings.

12. A compartmental cabinet as defined in claim 9, said locking means comprising a lever pivotally mounted on said closure member, lever means connected with one end of said lever and with one side of said last-named slidable means, whereby movement of said last-named slidable means imparts a turning movement of said lever, a plate having a plurality of ratchet teeth projecting from an edge thereof, said ratchet teeth being disposed in arcuate relationship, means fixedly securing said plate to said lever for movement therewith, said closure member having a handle mounted thereon, a shaft extending through said handle and said closure member and being rotatable with respect thereto, a pawl fixedly secured to one end of said shaft and adapted to engage a selected one of said ratchet teeth, resilient means connected with said pawl, said resilient means constantly biasing said pawl for engagement with one of said ratchet teeth, and a pawl operating lever fixedly secured to the other end of said shaft and positioned adjacent said handle.

13. A compartmental cabinet as defined in claim 8, a strip of flexible material secured to each of said stringers in a sinusoidal configuration to form a plurality of loops extending longitudinally thereof in spaced relation, and means adjacent the sides of said divider members for releasably engaging within the opposite ends of said loops.

14. A compartmental cabinet as defined in claim 8, and said divider members having an article-receiving recess formed in a side thereof.

15. A compartmental cabinet as defined in claim 14, and said divider members having a cut out portion extending inwardly from an edge thereof and communicating with said recess to facilitate the removal or placement of an article in said recess.

16. A compartmentalized cabinet comprising a substantially hollow rectangular member having an open side, a closure member for said open side, first guide means fixedly secured to closure member adjacent a pair of opposed sides thereof, a first pair of elements slidably mounted on said guide means, second guide means secured to said hollow member adjacent that side of said member oppositely disposed with respect to said closure member, a second pair of elements slidably mounted on said second guide means, two sets of levers, each set of said levers being connected in a lazy tong arrangement, means connecting a pair of levers at one end of each of said sets with one of said pairs of said first slidable elements, respectively, means connecting a pair of levers at the opposite ends of each of said sets with one of said second pairs of slidable elements, respectively, said sets of levers being disposed in spaced, confronting and substantially parallel relation, stringer means fixedly secured to said closure member and extending within said hollow member, and a plurality of partition elements secured to said stringer means at longitudinally spaced intervals with each adjacent pair of partition elements forming a compartment therebetween.

17. A cabinet as defined in claim 16, and said stringer means being formed of a flexible material.

18. A cabinet as defined in claim 16, and flexible means connecting said stringer means with said partition elements.

19. A cabinet as defined in claim 16, and means connected with and extending between said closure member and each one of said lazy tong sets for holding said closure member in a selected adjusted position relative to said hollow member.

References Cited in the file of this patent

UNITED STATES PATENTS

| | | |
|---|---|---|
| 328,475 | Ford | Oct. 20, 1885 |
| 607,539 | Camp | July 19, 1898 |
| 929,457 | Macon | July 27, 1909 |
| 1,216,250 | Bittle | Feb. 13, 1917 |
| 2,463,506 | Ball | Mar. 8, 1949 |